July 28, 1936.  F. KUBA  2,049,122

GEAR FOR CONVEYING ROTARY MOTION

Filed June 14, 1935

F. Kuba, Inventor

By Glascock Downing & Seebold
Attys.

Patented July 28, 1936

2,049,122

UNITED STATES PATENT OFFICE 2,049,122

GEAR FOR CONVEYING ROTARY MOTION

Franz Kuba, Vienna, Austria

Application June 14, 1935, Serial No. 26,682
In Austria June 19, 1934

2 Claims. (Cl. 74—63)

In my patent specification No. 1,903,053, dated March 28, 1933, I have described a screw and nut gearing for conveying rotary motion comprising two screws having a common axis but different pitches, one of said screws being relatively movable with respect to the other screw and constituting a driving screw, a reciprocable and rotatable intermediate screw member meshing with both screws, and a rotatable drive member held against movement axially of said screw and connected with said screw member for rotation therewith.

The same effect of conveying rotary motion can be obtained according to the present invention by using so-called flat helicoidal members in place of the cylindric screws.

In the case of a cylindric screw line, the point generating said line uniformly moves in a circular path but at a uniform pitch with respect to the plane of said circular path.

In the event of a flat helicoidal member line, the point generating said line uniformly moves in a circular path but radially in the plane of said circular path (Archimedian spiral).

If in the gear according to my patent specification No. 1,903,053, one of the two screws, having a common axis but different pitches, is rotated while the other screw is secured against movement, the intermediate screw member meshing with both said screws is screwed forward or backward (rotation and axial movement) whereby only the component of rotation of this screwing motion is conveyed to the outside, while the component of the axial movement of this screwing motion is isolated in the form of an inner gear motion.

If one of two flat helicoidal members is rotated while the other flat helicoidal member is secured against movement, an intermediate member arranged between the two flat helicoidal members will be caused to move radially as well as circular, thus the said intermediate member describing a flat helicoidal motion; it being only necessary to arrange the said intermediate member radially movable on a rotatable part of the gear in order that the component of rotation can be conveyed to the outside.

Figure 1:
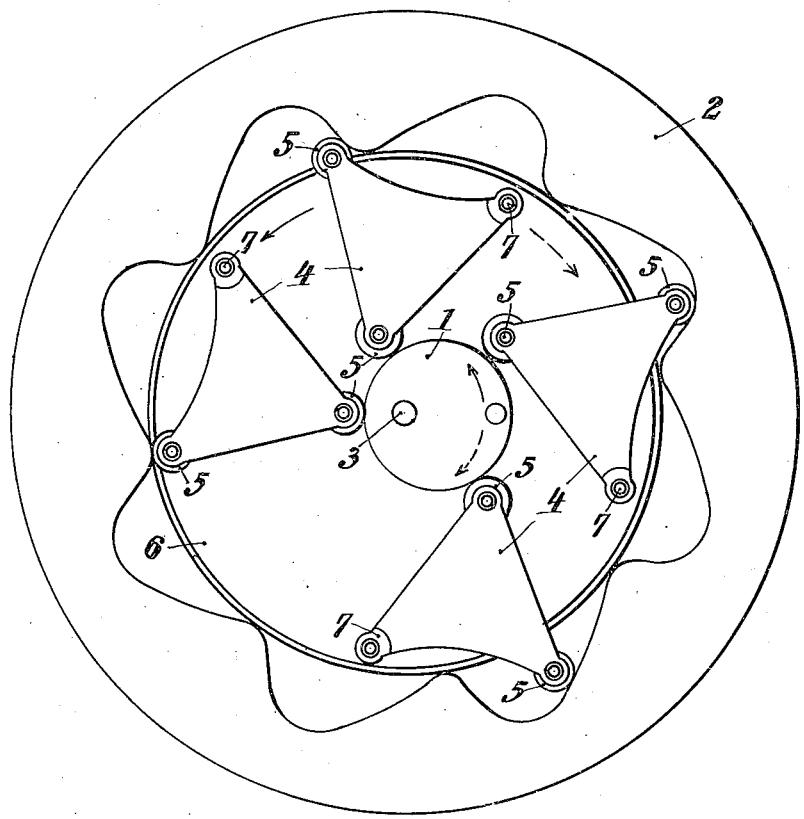
Figure 2:
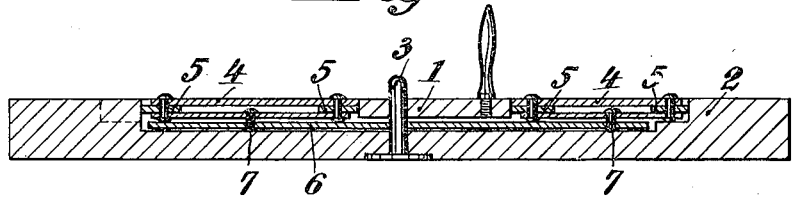

The drawing shows diagrammatically a gear constructed according to the invention, Figs. 1 and 2 showing the gear in plan view and in cross section respectively.

Two flat helicoidal members of non-uniform pitch are employed in the gear according to the present invention, one of said members being in the shape of a circular disk 1, the pivot of which is not disposed in the centre thereof (eccentric), while the other member 2 is arranged around the eccentric disk. The flat helicoidal member 1 is mounted on the gear-shaft 3, while the other flat helicoidal member 2 is immovable. The intermediate member consists of a lever 4 or the like provided with two rollers 5, one of said rollers co-operating with the movable flat helicoidal members 1, while the other roller bears on the immovable flat helicoidal member 2.

The lever 4 is rotatably mounted on a pivot 7, secured to a driven disk 6, rotating around the gear-shaft 3. A number of levers 4 are arranged on the disk 6 and are located in different operating positions. Any sliding friction is completely avoided in view of the rotatable arrangement of the intermediate members according to the present invention. Thus in this rotatable ratio gear are present only rotary movements and the same can be carried out by rollers (ball—or roller bearings).

Thus the rotatable ratio gear according to the present invention possesses a single shaft only, sliding friction as well as slipping being rendered impossible and therefore this gear possesses the advantages of absolute exactness and flat construction and satisfies the most different conditions particularly high number of rotations.

What I claim is—

1. A gear for conveying rotary motion, comprising in combination an immovable member furnished with a flat helicoidal operating face, a flat helicoidal driving member arranged rotatable within the range of said immovable member, a driven member mounted also within the range of said immovable member, intermediate members pivoted to said driven member, and sliding means attached to said intermediate members and co-operating with the flat helicoidal curves of said immovable member and with said driving member.

2. A gear for conveying rotary motion, comprising in combination an immovable member furnished with a flat helicoidal operating face, a flat helicoidal driving member arranged rotatable within the range of said immovable member, a driven member mounted also within the range of said immovable member, intermediate members pivoted to said driven member, and rollers arranged on said intermediate members and co-operating with the flat helicoidal curves of said immovable member and with said driving member.

FRANZ KUBA.